W. H. WALKER.
HARROW ATTACHMENT FOR PLOWS.
APPLICATION FILED MAR. 2, 1909.
957,722.
Patented May 10, 1910.
3 SHEETS—SHEET 1.
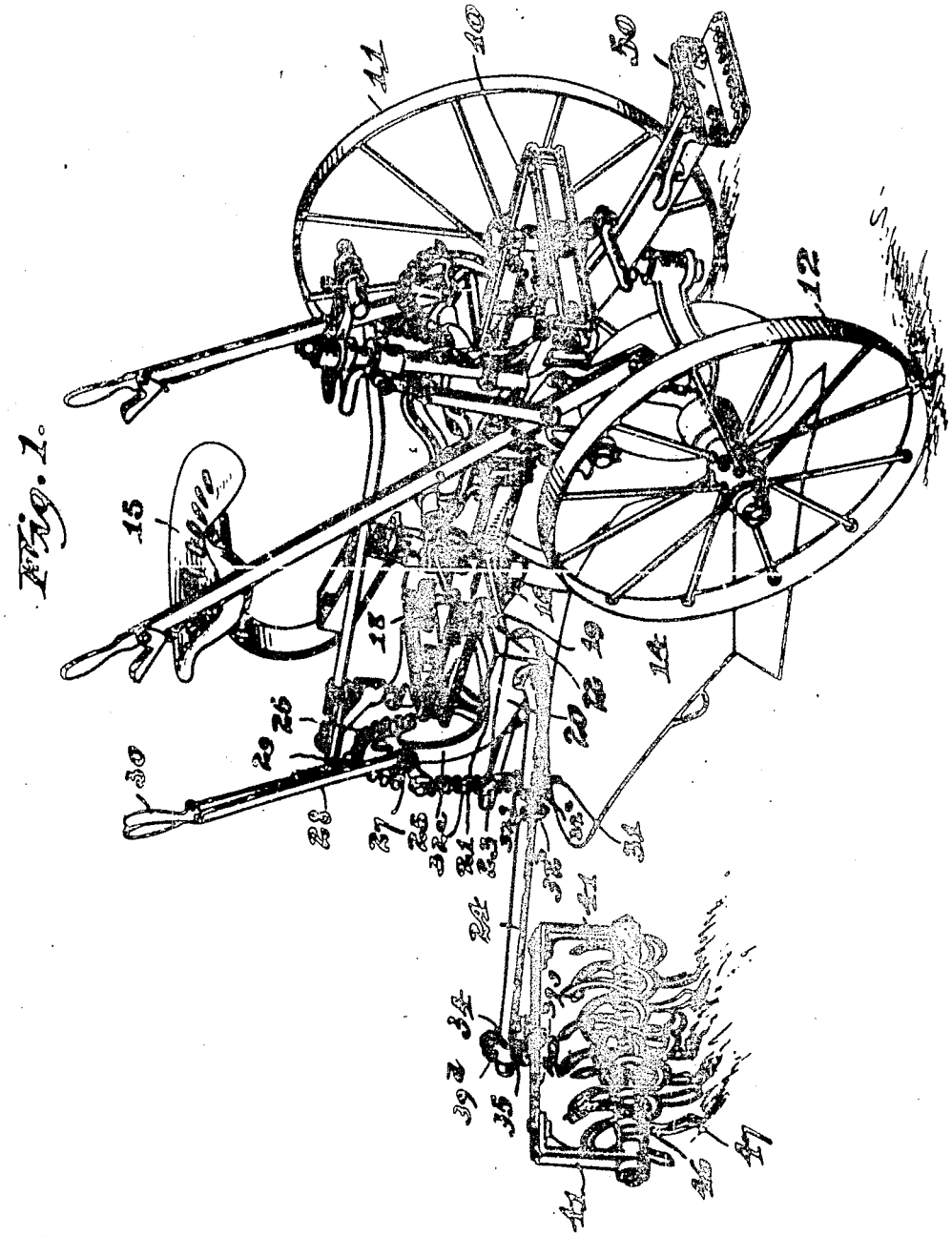

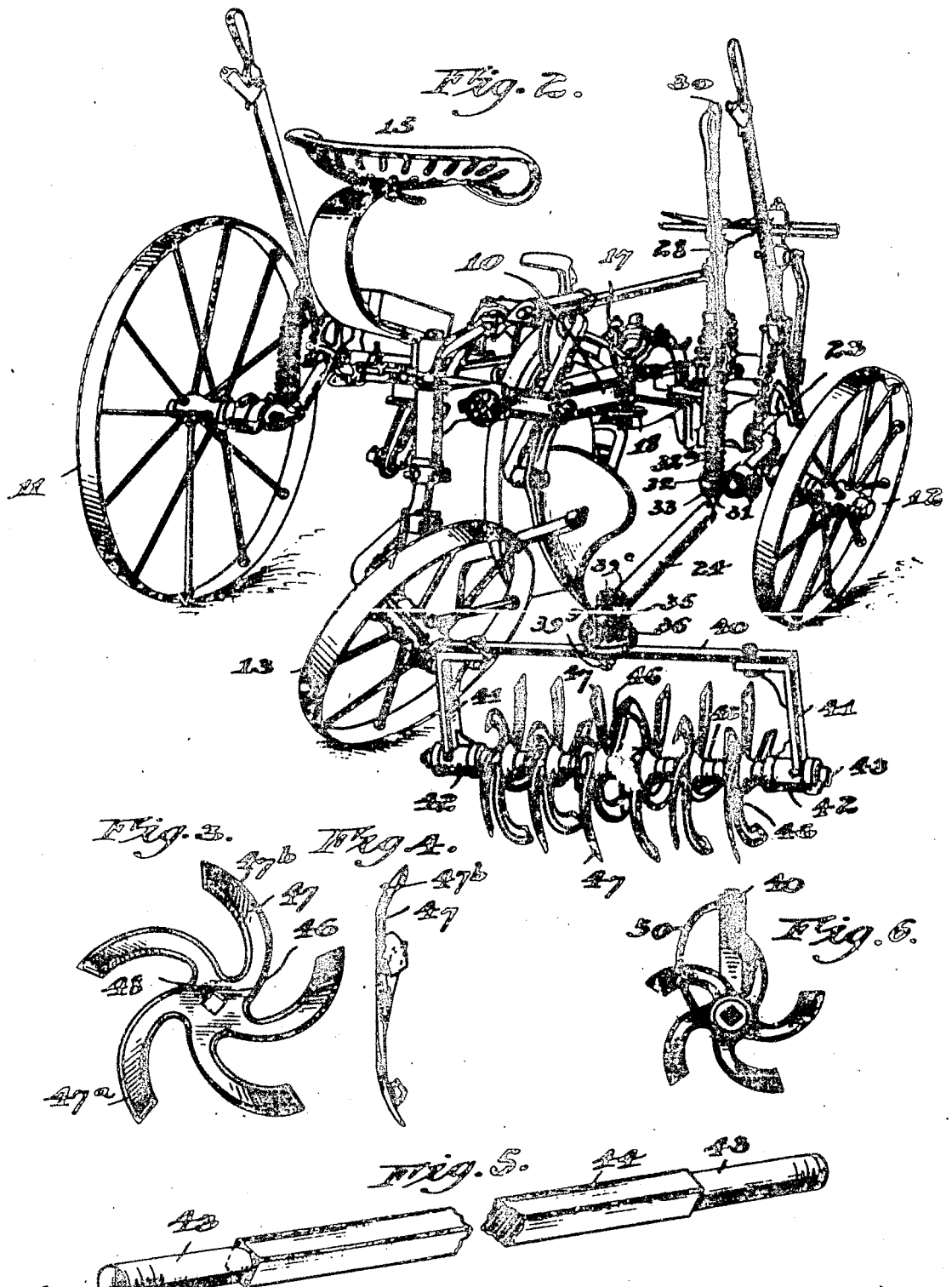

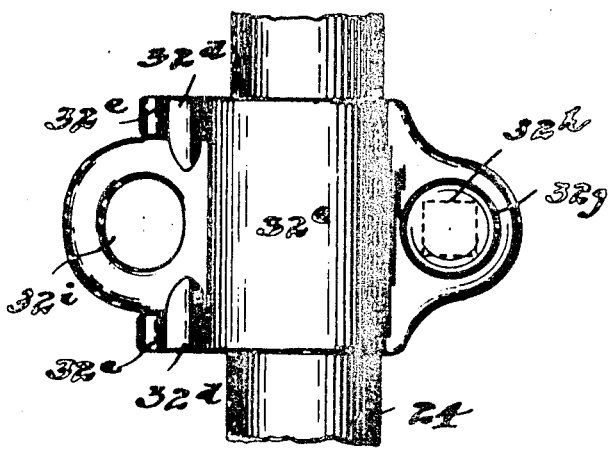
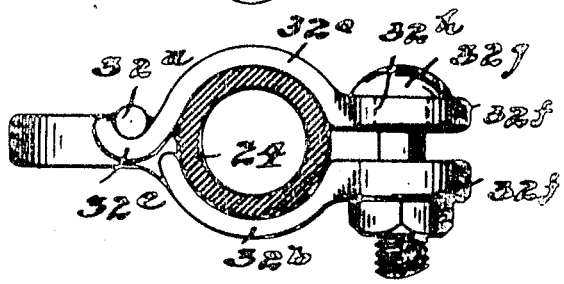
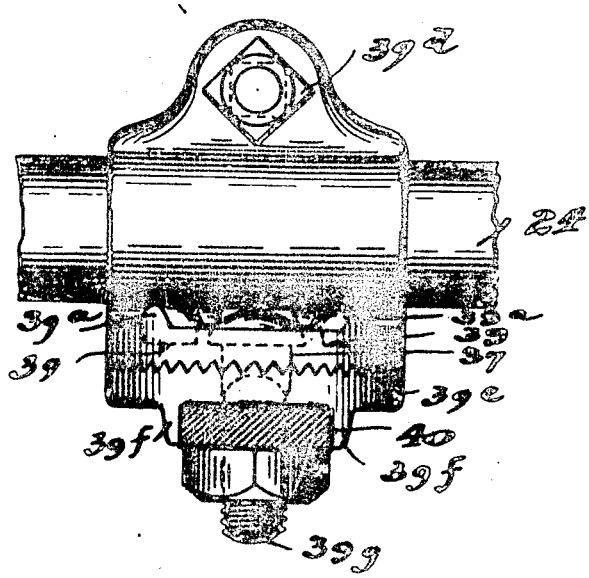
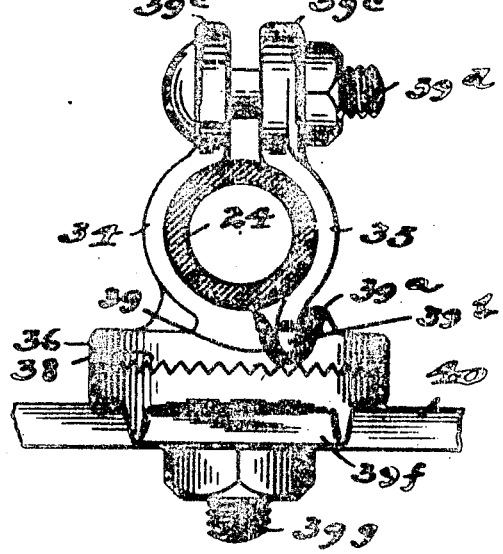

UNITED STATES PATENT OFFICE.

WARREN H. WALKER, OF RACINE, WISCONSIN, ASSIGNOR TO RACINE ECONOMY SPRING COMPANY, OF RACINE, WISCONSIN, A CORPORATION OF WISCONSIN.

HARROW ATTACHMENT FOR PLOWS.

957,722.  Specification of Letters Patent.  Patented May 10, 1910.

Application filed March 2, 1909. Serial No. 480,830.

*To all whom it may concern:*

Be it known that I, WARREN H. WALKER, a citizen of the United States, residing at Racine, in the county of Racine and State of Wisconsin, have invented certain new and useful Improvements in Harrow Attachments for Plows, of which the following is a specification.

My invention concerns rotary harrow appliances adapted to be secured to the frames of plows, whereby the farmer can plow, harrow, and smooth his land at one operation, the harrowing and smoothing occurring while the natural moisture of the ground is retained, that is, immediately after the plow has turned the furrow and before the sun and wind have had time to dry out and possibly harden the soil. Harrow attachments of this general character have been known heretofore, but my invention pertains to improvements which render the operation of such devices more satisfactory.

One object of the invention is to so journal the supporting shaft or arm carrying the cutting harrow members that it will be comparatively near the line of draft on the plow.

The second object is to so construct the attachment that a short or restricted movement only of the operating lever is required to raise or lower the harrow.

The third purpose and aim is to so make the device that a comparatively long coil compression spring can be used between the shaft and the segment to which the actuating lever is adapted to be latched or locked in adjusted position.

To secure a more satisfactory cutting and smoothing effect by the harrow, I provide the latter with cutters each having five curved, sharp-edged blades, the blades of the various cutters being arranged spirally or "auger-wise" on a square shaft, such construction and arrangement of cutters and blades, since they leave the soil substantially perpendicularly, eliminating any tendency for the blades to lift or raise stalks, weeds and the like against any scrapers or cleaners which may be employed.

These, with other features of novelty and improvement which will be made apparent from the following detailed description of a preferred embodiment of the invention, characterize my machine and render it a decided and marked improvement over the devices now found on the market.

In the accompanying drawings, forming a part of this specification,—Figure 1 is a front perspective view of a sulky plow equipped with one form of my improved harrow attachment; Fig. 2 is a rear perspective view of the same construction; Fig. 3 is a face view of one of the harrow cutters; Fig. 4 is an edge view of the same; Fig. 5 is a broken perspective view of the cutter shaft; Fig. 6 is a vertical section through the harrow, showing the use of scrapers or cleaners; Fig. 7 is a top plan view and Fig. 8 an end elevation of the clip fastened to the supporting shaft, the latter in Fig. 8 being shown in section; and Figs. 9 and 10 are face and end (partly in section) views of the attaching means for securing the harrow frame to the rear end of the supporting shaft or pipe, the top frame bar being shown in section in Fig. 9.

Referring to the drawings, it will be noted that the sulky plow illustrated has a supporting frame 10, carrying wheels 11, 12 and 13, a plow proper 14, and a seat 15 for the operator. The harrow attachment comprises a bracket 16 secured by a pair of straps 17 and coöperating nuts 18 to the outer face of one of the longitudinal members or bars of the plow frame 10. This bracket has an integral, outstanding, substantially-horizontal shelf or plate portion 19 to which is fastened a bearing member 20 by means of a vertical bolt 21, which permits rotary adjustment of the member relative to the bracket and plow frame, as will be readily understood, the coöperating faces of the two parts being equipped with radial teeth or serrations to prevent unintentional turning or displacement. This member 20 in its lower portion below the shelf 19 is supplied with a bearing 22, rotatably supported in which is an inturned end 23 of a hollow pipe or supporting shaft 24 extended both rearwardly and outwardly from the bracket and plow frame, as is clearly shown. This bearing member 20 is also supplied with a rearward, upwardly-projecting, integral, curved arm 25, bearing at its upper end a notched segment 26 of the usual and ordinary construction. On a bolt or pin 27 concentric with the segment 26 I fulcrum or pivot an upwardly-extended bell-crank handle 28 supplied with a spring-actuated locking-dog 29 operated by a supplemental handle 30 pivoted on the bell-crank 28, as is illustrated. To the short arm of the bell-crank I pivot a link or rod 31, the lower end of which extends through an aperture of a clip 32 fastened to the shaft 24, a coil compression spring 32ª being interposed between such clip and the bell-crank, while the lower threaded end of the link is supplied with a stop nut 33 bearing against the under face of the clip. This clip 32 is preferably composed of two parts 32ᵇ and 32ᶜ, the former having at one side of the shaft 24 a pair of oppositely-extended, integral, hinge pins 32ᵈ, while the companion member 32ᵉ is supplied with a pair of hook-shaped ears 32ᵉ adapted to engage the under sides of the hinge pins 32ᵈ and form a hinge or pivotal connection between the two parts of the clip, which are formed to readily accommodate and grasp the pipe or shaft 24 securely to prevent displacement or dislodgment of the clip. On the opposite side of the shaft the two parts of the clip have parallel spaced lugs or ears 32ᶠ apertured to accommodate the clamping bolt 32ᵍ, held from turning in one of the parts or lugs by a squared portion 32ʰ. The aperture 32ⁱ of the part 32ᵇ, shown in Fig. 7, is, as will be readily understood, provided for the accommodation of the link or rod 31.

Adjustable lengthwise on the shaft or supporting pipe 24 is a clamp composed of two parts 34 and 35, each having an integral concave recess to conform to the exterior curvature of the pipe or shaft 24. The part 34 has a round base 36 centrally supplied with a vertical square aperture 37 and provided on its under face with a series of radial teeth or serrations 38. On the top of the base portion 36 and beneath the tube or shaft 24 this base is equipped with a pair of recesses 37, adjacent to which are a pair of upstanding lugs or ears 39ª. The member 35 of this clamp has at its lower edge a pair of hinge ears 39ᵇ adapted to disengageably fit and turn in the recesses or sockets 39, forming a hinge connection therewith. Both parts of this clamp have upstanding, apertured lugs 39ᶜ through the holes of which a bolt 39ᵈ passes to fasten the clamp on the pipe or tube in an obvious manner. Beneath the base 36, and between the same and the frame bar 40 of the harrow, I interpose a securing member 39ᵉ having radial teeth coöperating with those of the part 36, and also having projecting downwardly from its under surface a pair of ears or guides 39ᶠ fitting on opposite sides of the bar. The three parts 34, 39ᵉ and 40 are held together by a bolt 39ᵍ passing through apertures in the parts and prevented from rotation by an angular portion fitting in the square hole 37. The transverse bar 40 has at its opposite ends downwardly-extended arms 41 supplied at their lower ends with alined bearings 42 adapted to accommodate the cylindrical end portions 43 of a cutter shaft 44 which is square in cross-section for the greater portion of its length between the bearings 42, as is indicated in Fig. 6. On this shaft I mount and properly space apart by spools or sleeves 45 a plurality of cutters 46, each having five outwardly-extended, bent arms 47, each of which has a front curved cutting edge 47ᵇ, as is clearly shown in Fig. 3, such arms being laterally deflected or bent, as is shown in Fig. 4.

Each cutter has a central square hole of substantially the same size and shape as the angular cross-section of shaft 44, the cutters being placed on such shaft in such relation that their blades 47 are arranged spirally or "auger-wise," that is, each cutter is angularly displaced with relation to its adjacent cutters to the extent of 90 degrees, which arrangement, because of the fact that each cutter is supplied with five blades, causes such blades to assume the spiral relation indicated in the drawings. I have found that the number of blades which such a cutter should have, the size of the whole cutter, and the curvature of such blades transversely of the axis of the cutter are important matters, and that by supplying each of said cutters with five blades they can be so spaced apart and given such curvature that they will leave the ground substantially perpendicularly, thereby eliminating all tendency for stalks, weeds and the like to be lifted by the blades and caught between them and the harrow frame or any weed collector or extractor which may be employed. An examination of Fig. 3 of the drawings will show how the blade 47 would lift the ground in a substantially vertical manner so that it would not act as a carrier or lifter of any stalks or weeds. This result can only be secured, however, by having the proper number of blades and giving the same the proper curvature.

As the plow is advanced or drawn forwardly by draft animals attached to the draft appliance 50, the plow 14 turns the furrow, and the rotary action of the cutters 46 harrows the ground and smooths the same before the earth has had a chance to become dried or hardened. The shaft or supporting pipe 24 may be adjusted toward and from the frame of the plow as is found desirable or necessary by properly positioning the bearing member 20 on the bracket shelf or support 19. The harrow itself may be adjusted angularly with respect to such shaft by loosening the nut of bolt 39 and turning the harrow frame, composed of the bars 40 and 41, with relation to the clamp 34—35, the members being again secured together in adjusted relation, as will be readily understood. By actuating the harrow lifting lever or bell-crank 28, which is within convenient reach of the operator in the seat 15, the harrow may be lifted through the link 31 and nut 33, which, as has been explained above, contacts and co-acts with the under surface of the clip 32. When the harrow is thrown down into the ground by shifting the lever 28 and locking the same in place by the dog 29 engaging one of the notches of segment 26, the harrow is still able to rise and ride over obstructions, such temporary upward movement being permitted by compression of the coil spring 32ª which normally yieldingly holds the harrow down to its work.

The cutters during their rotation act to churn and stir up the earth, smoothing the earth turned from the furrow, and leaving the field substantially smooth.

In some cases it may be desirable to employ cleaners to prevent sticky earth from adhering to the spools between the rotary cutters, and in Fig. 6 I have indicated in cross-section how such cleaners or scrapers 50ª may be attached to the harrow frame bar 40 and extend downwardly rearwardly of and adjacent to the hubs of the cutters and the spools between the same to prevent the accumulation of clay, mud, or sticky earth on such parts.

Whereas I have shown and described in detail the various structural features of the members constituting my improved harrow attachment, it is to be understood that the invention is not limited and restricted to the precise construction shown and described, because such machine or appliance is susceptible of a variety of modifications and changes without departure from the substance of the invention.

I claim:

1. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge are disposed substantially vertically when leaving the earth, substantially as described.

2. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge move substantially vertically when leaving the earth, substantially as described.

3. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge are disposed and move substantially vertically when leaving the earth, substantially as described.

4. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge are disposed and move substantially vertically when leaving the earth, said cutters being arranged on said shaft with the blades thereof disposed spirally, substantially as described.

5. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge are disposed and move substantially vertically when leaving the earth, said blades being bent laterally longitudinally of said axis, substantially as described.

6. In an appliance of the character described, the combination of a cutter frame, a revoluble cutter shaft in said frame, and a plurality of cutters on and rotatable with said shaft, each of said cutters having only five cutting blades curved transversely of the axis of the cutter, each of said blades being so shaped that the successive portions of its forward cutting edge are disposed and move substantially vertically when leaving the earth, each cutter being shifted angularly 90° around said shaft with relation to its adjacent cutters, whereby the blades of said cutters are spirally arranged.

7. In an appliance of the character described, the combination of a cutter frame, a revoluble cutter shaft in said frame, and a plurality of cutters on and rotatable with said shaft, each of said cutters having only five integral outstanding sharp-edged blades each of which is curved transversely with respect to the axis of the cutter and so shaped that the successive portions of its forward cutting edge are disposed and move substantially vertically when leaving the earth, each of said blades being also bent laterally longitudinally of said axis, each cutter being shifted angularly 90° about said axis with relation to its adjacent cutters, whereby the blades of said cutters are spirally arranged, the forward cutting edges of said blades extending substantially the full length of the latter, substantially as described.

8. A revoluble cutter for harrows having only five outstanding integral sharp-edged blades each of which is so curved transversely with respect to the axis of the cutter that the successive portions of its forward cutting edge are disposed and move substantially vertically when leaving the earth, substantially as described.

9. A revoluble cutter for harrows having only five outstanding integral sharp-edged blades each of which is so curved transversely with respect to the axis of the cutter that the successive portions of its forward cutting edge are disposed and move substantially vertically when leaving the earth, each of said blades being also bent laterally longitudinally of said axis, substantially as described.

WARREN H. WALKER.

Witnesses:
 WILLARD T. WALKER,
 LOUISE LYON.